United States Patent [19]

Schlueter

[11] 4,338,770
[45] Jul. 13, 1982

[54] ROW UNIT FOR A COTTON HARVESTER

[75] Inventor: Francis E. Schlueter, Des Moines, Iowa

[73] Assignee: Deere & Company, Moline, Ill.

[21] Appl. No.: 266,877

[22] Filed: May 26, 1981

[51] Int. Cl.³ .............................. A01D 46/12
[52] U.S. Cl. .................................. 56/33; 56/DIG. 9
[58] Field of Search ...................... 56/28–50, 56/13.6, DIG. 9

[56] References Cited

U.S. PATENT DOCUMENTS

| | | | |
|---|---|---|---|
| 2,491,777 | 12/1949 | Smith | 56/33 |
| 2,673,440 | 3/1954 | Sawyer et al. | 56/33 |
| 2,674,080 | 4/1954 | Wilson | 56/30 |
| 3,105,340 | 10/1963 | Hewitt | 56/28 |
| 3,397,523 | 8/1968 | Hubbard | 56/41 |
| 3,483,686 | 12/1969 | Long et al. | 56/35 |
| 3,714,767 | 2/1973 | Hubbard | 56/208 |
| 3,716,976 | 2/1973 | Copley | 56/106 |
| 3,734,563 | 5/1973 | Schlueter | 298/8 |
| 4,125,988 | 11/1978 | Schlueter | 56/30 |

Primary Examiner—Robert A. Hafer

[57] ABSTRACT

For a cotton harvester, a low profile row unit which is light in weight and which has a removable top panel structure for easy access to the brush rolls and augers. Rows of horizontal bristles mounted on the panel structure close the top of the row unit to prevent detached cotton from being thrown out of the harvesting compartment. A reinforced lower shell assembly maintains sufficient transverse and vertical stability in the row unit structure and together with the top panel structure eliminate need for an upper supporting arch.

59 Claims, 9 Drawing Figures

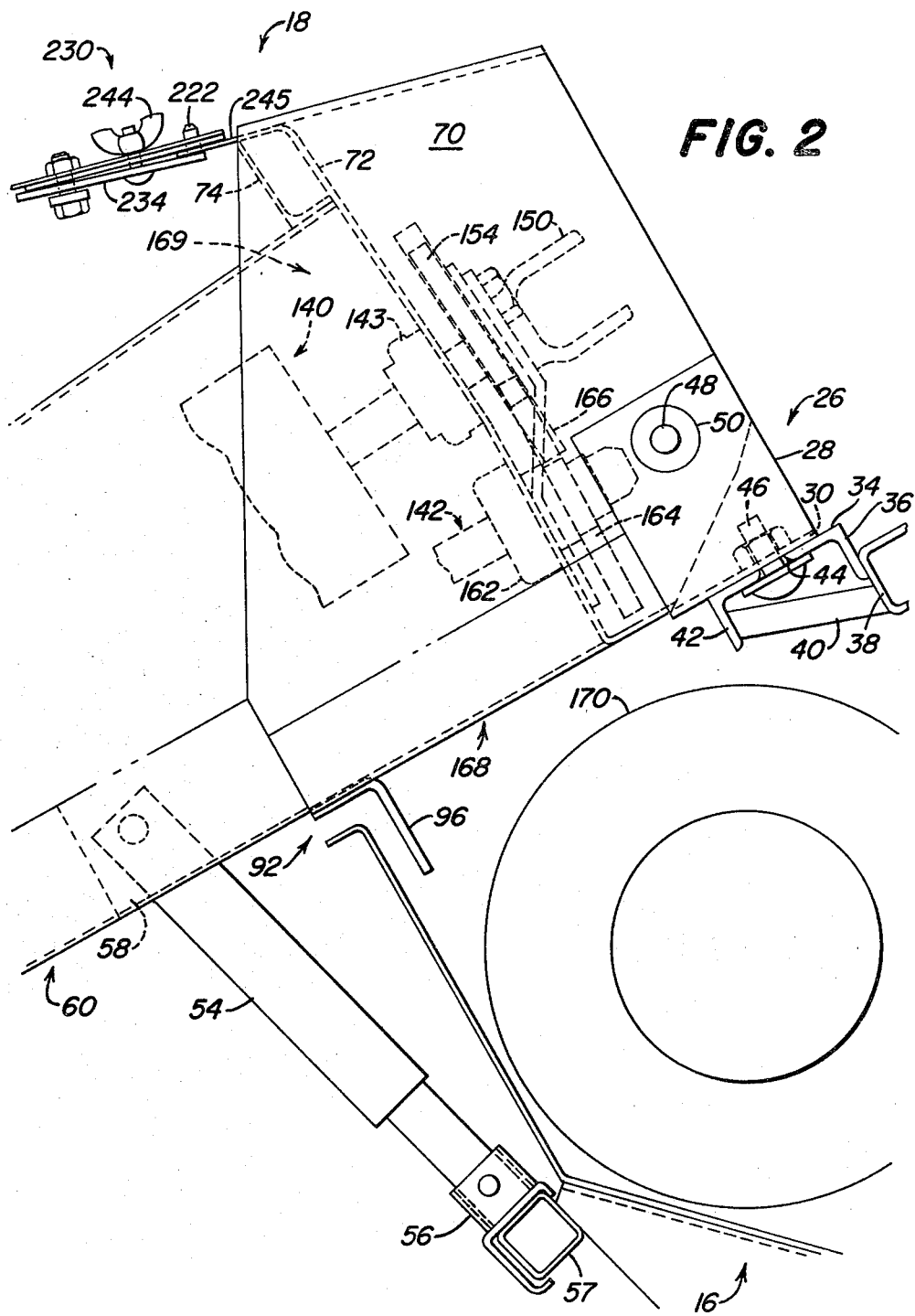

ROW UNIT FOR A COTTON HARVESTER

BACKGROUND OF THE INVENTION

The present invention relates generally to cotton harvesters and more specifically to a low profile row unit for a cotton harvester.

Cotton harvesters, particularly cotton strippers of the type shown, for example, in U.S. Pat. Nos. 3,714,767, 3,716,976, 3,734,563 and 4,125,988, include row units that define a harvesting compartment. Cotton plants enter a forwardly opening plant passage in the row unit as the harvester moves forwardly through the field, and counter-rotating brush rolls strip the cotton from the plants. Row unit augers move the stripped cotton rearwardly from the harvesting compartment to a cross auger on the harvester. Heretofore, it has been necessary to provide the row units with a relatively high front wall structure such as shown at 31 in the aforementioned U.S. Pat. No. 4,125,988. The front wall structure had to be approximately as high as the tallest cotton plants so that the mouth of the plant passage could receive the plants into the harvesting compartment. The front wall structure together with a closed overhead panel structure was part of a structural arch affording stability to the entire row unit and maintaining the desired spacing between the brush rows on either side of the plant passage. The high front and closed panel structure has provided necessary strength to the stripping units and together with the use of chains or vertical rows of brushes to close the mouth of the passage, as described in the aforementioned U.S. Pat. No. 4,125,988, have provided a harvesting compartment which satisfactorily confines detached and vigorously agitated cotton until it is removed by the row unit augers.

However, several problems exist with the above-described cotton stripper row units. The high arch construction necessary for support and for preventing cotton from being thrown out of the unit significantly reduces visibility and prevents the operator from seeing the portions of the rows of plants directly ahead of the row units. With his vision in front of the row unit impeded, the operator often has difficulty maintaining the plant passage aligned with the row, particularly when there is, in addition, a heavy amount of dust and debris boiling from the row unit as a result of the vigorous action of the stripper rolls. If the row units move slightly off of the rows, the cotton plants will be pulled under the units rather than being stripped thereby, and productivity will be reduced. Often the field will have to be stripped a second time.

A further problem is that the row units which utilize the high arch construction are relatively hevay and are bulky to handle. As the row handling capacity of harvesters increases, the weight of additional row units can adversely shift the center of gravity of the harvester.

Another problem with the above-described structure is that the harvesting compartment is relatively inaccessible, and removing blockages, rocks or debris, or replacing or repairing brush rolls and unit augers is difficult and time consuming. Although top panels can be removed, the height of the unit makes access, particularly to the lower front of the unit, very difficult. In many units, there are structural members directly over the brush rolls and augers that limit access into the lower portion of the harvesting compartment. It is not uncommon for an operator, after removing the panels and clearing out an obstruction, to find that the primary cause of the problem was overlooked because of limited visibility into the unit. Locating and cleaning obstructions or detecting areas in need of repair within the compartment can therefore be very time consuming as well as frustrating for the operator.

Still another problem with previously available row units is that they typically utilize a head sheet at the rear of the unit auger housing which prevents cotton plants from moving rearwardly beyond the end of the brush rolls. The head sheet often traps stalks and debris and is a primary source of blockage in a row unit. The brush rolls tend to wear more quickly in the area of the sheet than elsewhere along their length. In addition, the sheet adds to the weight of the row unit.

SUMMARY OF THE INVENTION

It is, therefore, an object of the present invention to provide an improved row unit for a cotton harvester.

It is another object of the invention to provide a cotton harvester row unit with a low profile for increased visibility and a more compact appearance as compared with previously available row units. It is a further object to provide such a row unit which is lighter in weight and much easier to handle than previously available row units.

It is still another object of the invention to provide a cotton harvester row unit with a removable top panel structure for convenient access to the cotton harvesting and conveying mechanisms in the harvesting compartment. It is a further object to provide such a row unit which permits problem areas to be located faster and easier than with previously available row units.

It is yet another object of the invention to provide a row unit which has reduced forward height compared to previously available row units but which permits the cotton plants to be directed into the harvesting compartment without loss of cotton even when the plants are taller than the top of the forward portion of the row unit. It is a further object to provide such a row unit with an opening in the top panel structure which is closed by horizontal rows of bristles extending from front to rear which permit the cotton plants to be directed into the harvesting compartment but prevent the removed cotton from being thrown upwardly through the opening.

It is another object of the invention to provide a cotton harvester row unit with a lower shell structure which maintains row unit stability and proper brush roll spacing on opposite sides of the plant passage and eliminates the need for an upper structural arch or similar structure.

It is a further object of the invention to provide a cotton harvester row unit which has less parts and is lighter than conventional row units. It is yet another object to provide such a row unit which is easier and less expensive to construct than most other types of cotton harvester row units.

It is another object of the invention to provide an improved cotton harvester row unit of the brush roll type which reduces blockages near the rear of the brush rolls. It is a further object to provide such a row unit wherein the rear portions of the brush rolls wear more slowly than with previously available row units, to thereby permit the brushes and flaps to be reversed for extended life and wherein the cotton from the unit augers is power discharged into the cross auger.

In accordance with the above objects, a row unit is provided having a rear support structure from which is supported a pair of transversely spaced downwardly and forwardly directed side structures between which is defined a plant passage. Reinforcing members are provided to afford both vertical and lateral stability to the side structures to thereby eliminate need for an upper supporting arch or closed upper structure. A pair of removable upper panel structures are each releasably secured above a corresponding side structure. The panel structures include forward gathering structure and upper horizontal panel structure which, when attached to the side structures define therebetween an upright opening at the mouth of the plant passage and a fore-and-aft upper opening extending rearwardly from the mouth directly above the plant passage. The upright opening is closed by horizontal bristles mounted in columns on the gathering structure. The upper opening is closed by horizontal bristles attached to the upper panel structure in rows extending from the front to the rear along the opening. A low profile row unit is provided which is light in weight and slopes downwardly in the forward direction to provide increased visibility directly ahead of the unit. The upper panel structures are quickly and easily removed to provide convenient access to the brush rolls and row unit augers. The upper opening closed by the bristles permits even the tallest cotton plants to enter the harvesting compartment while preventing removed and agitated cotton from being thrown from the compartment. Single wall construction behind the lower opening to the cross auger eliminates need for a head sheet and reduces the number of blockages at the rear of the unit. The brush rolls and cross auger extend rearwardly over the opening to keep the area free of stick and trash build-up and reduce brush and flap wear at the rear end of the brush roll. Extending the unit augers rearwardly over the opening provides an advantageous power discharge of cotton from the units into the cross auger.

These and other objects, features and advantages will become apparent from the detailed description which follows in connection with the accompanying drawings.

BRIEF DESCRIPTION OF THE DRAWINGS

FIG. 2 is an enlarged side view of the rear portion of the row unit of the present invention supported on the cross auger frame of the cotton harvester.

DESCRIPTION OF THE PREFERRED EMBODIMENT

Figure 1:
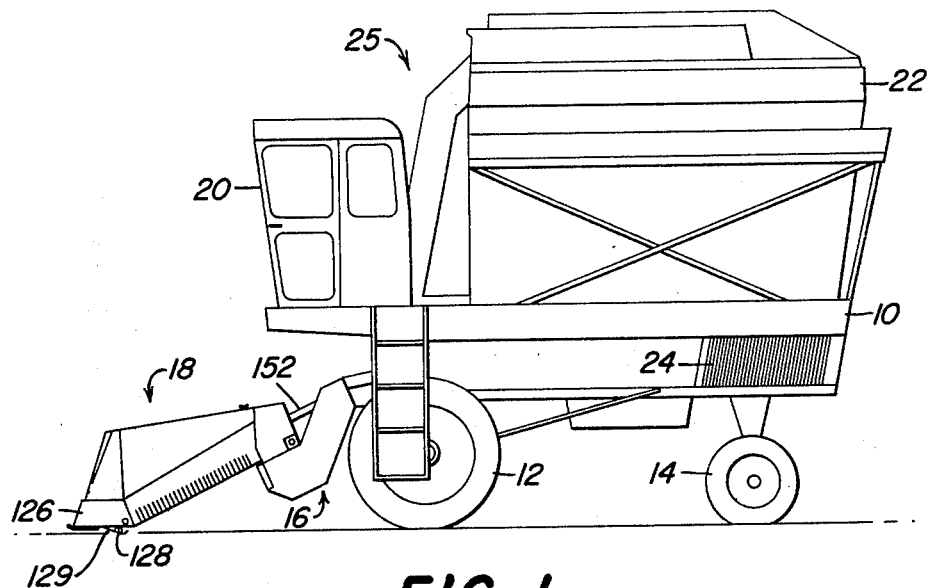
FIG. 1 is a side view of an entire cotton harvester.

A cotton harvester utilizing the row unit of the present invention may be generally of the type shown in the aforementioned U.S. patents, incorporated herein by reference. The harvester (FIG. 1) includes a tractor or frame 10 having front traction wheels 12 and a rear steerable wheel 14. A cross auger frame 16 is supported on the forward end of the frame 10 and supports a plurality of transversely spaced row units 18 above the ground. An operator's station or cab 20 is carried on the forward portion of the frame 10, and a cotton receptacle 22 is supported behind the cab. A power source or engine 24 provides drive through conventional drive assemblies to the traction wheels 12 and row units 18, and to a conventional cotton conveying system 25 for moving the cotton from the row units to the receptacle 22. Although the row units 18 of the present invention are shown mounted on a self-propelled cotton harvester of the type shown in the aforementioned U.S. patents, it is to be understood that they be mounted on other types, such as a tractor mounted harvester of the type shown in co-pending application Ser. No. 266,876, entitled "TRACTOR MOUNTED COTTON HARVESTER" filed concurrently herewith.

Figure 6:
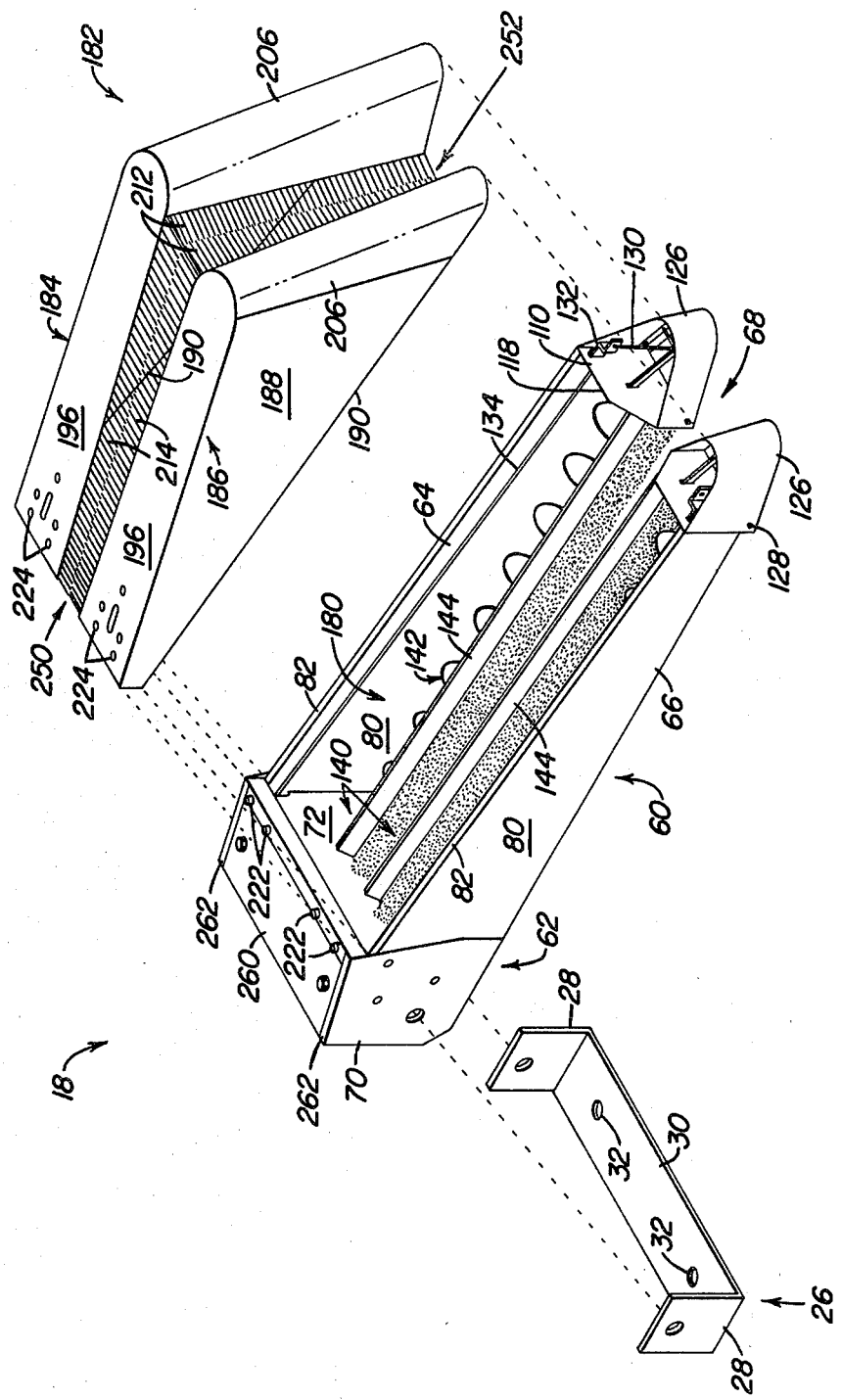
FIG. 6 is a perspective view of the row unit with the overhead panel structure removed to expose the cotton harvesting and conveying mechanisms in the harvesting compartment.

The row units 18 may be mounted in any suitable conventional manner on the cross auger frame 16. However, in the preferred embodiment, as best understood by reference to FIGS. 2 and 6, each row unit 18 is connected to and transversely adjustable on the cross auger frame 16 by a unit support bracket 26. The bracket 26 includes upright side plates 28 spaced by a lower connecting plate 30. Holes 32 are provided in the connecting plate 30.

A downwardly opening channel-shaped member 34 (FIG. 2) is welded at rear lip 36 to a square tubular transverse beam 38 which forms part of the cross auger frame 16. Transversely spaced support members 40 are connected between the beam 38 and front lip 42 of the member 34. A plurality of transversely spaced sets of holes 44 are located in the top of the member 34. The bracket 26 is supported on the member 34 with the connecting plate 30 resting on the member. Bolts 46 are inserted through the holes 32 in the bracket 26 and through a set of holes 44. The set of holes 44 is selected in accordance with the desired transverse location of the row unit 18 with respect to the cross auger frame 16. The row unit 18 is pivotally connected to the bracket 26 between the side plates 28 by a pivot assembly including pivot pins 48 or other suitable pivot means and spacers 50 located at the lower rear portion of the row unit. The row unit 18 is rockable up and down about the axis of the pins 48.

Figure 4:
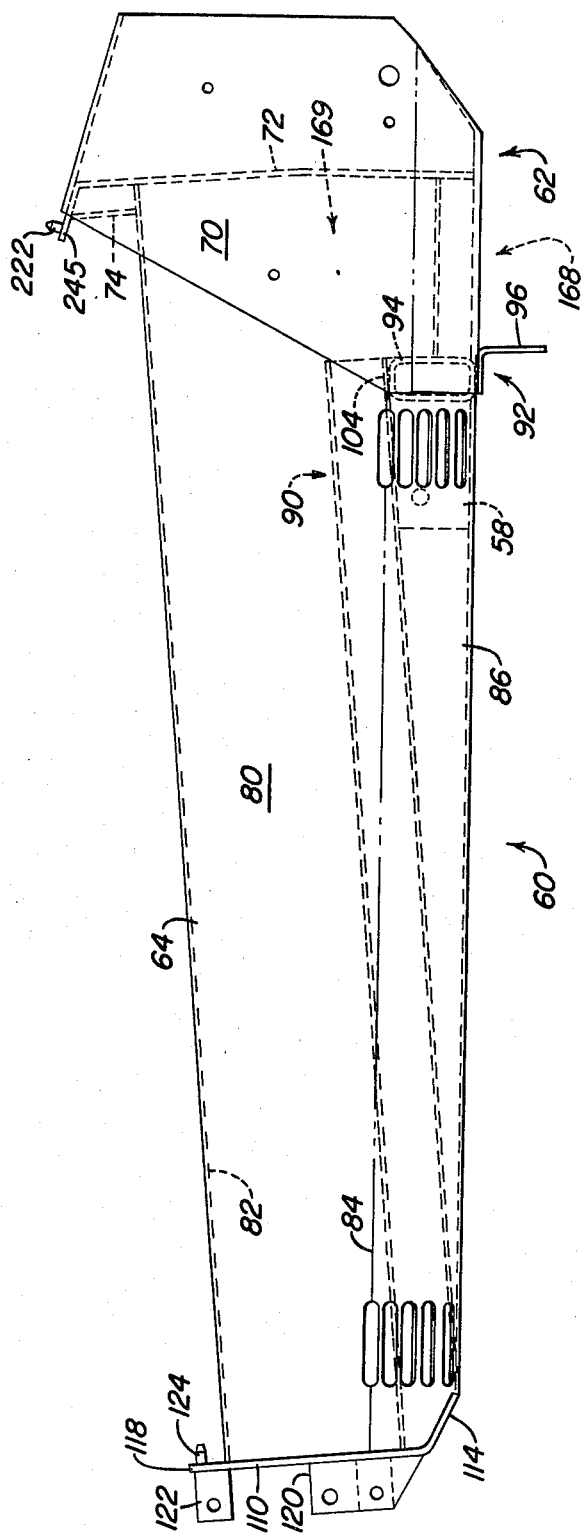
FIG. 4 is a side view of the shell assembly shown in FIG. 3.

A hydraulic cylinder 54 is pinned at its rod end to a lower bracket 56 which is slidably mounted on a square tubular beam 57 which forms the lower front portion of the cross auger frame 16. The anchor end of the cylinder 54 is pinned to a bracket 58 (FIG. 4) on row unit lower shell or frame assembly 60 forwardly adjacent the cross auger frame 16. Extending and retracting the cylinder 54 pivots the row unit 18 about the axis of the pins 48 to raise and lower the forward portion of the unit with respect to the cross auger frame 16.

Referring now to FIGS. 3–6, the row unit shell or frame assembly 60 includes a rear wall or mounting structure indicated generally at 62. The unit frame also includes substantially parallel and spaced apart left- and right-hand side structures or harvesting mechanism supports 64 and 66, respectively, extending forwardly from the rear mounting structure 62. A fore-and-aft extending plant passage 68 is defined between the supports 64 and 66 which are substantially cantilevered from the rear mounting structure 62 and terminate at the mouth or fore end of the passage in free non-connected ends. One of the supports 64 and 66, however, is braced by the hydraulic cylinder 54 slightly forwardly of the rear mounting structure.

The rear mounting structure 62 includes transversely spaced sidewalls 70 connected by an upright rear wall or panel 72. An angle member 74 is welded to the upper extremity of the rear wall 72 and extends transversely between the sidewalls 70. The walls are flanged at locations 76 to provide strength and rigidity to the rear mounting structure 62.

The side structures 64 and 66 include outer upright sidewalls 80 which extend rearwardly to the rear wall or panel 72. Each sidewall 80 is positioned against the inside of the corresponding rear mounting structure sidewall 70 and is connected thereto by welding or other suitable attaching means. The top of the sidewall 80 terminates in an inwardly directed flange 82. Each sidewall 80 is curved inwardly at location 84 to form an upwardly opening auger trough 86 of a substantially semicircular cross-section which terminates at an inner edge 88. Extending inwardly from the edge 88 and welded thereto is a channel-shaped brush roll support 90 which is inclined upwardly toward the rear at an angle of about five degrees with respect to the axis of the auger trough 86.

The rear of the auger trough 86 and the brush roll support 90 are welded or otherwise connected to a transverse structural member indicated generally at 92 which includes a tubular beam 94 and an angle 96 welded to the bottom of the beam 94. The tubular beam 94 extends transversely between outer upright sidewalls 97 (FIG. 5) of the brush roll support 90. The ends of the beam 94, as well as the edges 88 of the troughs 86, are connected such as by welding to the outer sidewalls 97. The sidewalls 97, along with inner upright sidewalls 98, provide a generally downwardly opening channel-shaped configuration to the brush roll supports 90 for strengthening the side structures 64 and 66. Each brush roll support 90 is angled upwardly and outwardly from a fore-and-aft extending bend location 100, and the outer sidewalls 97 cooperate with the auger troughs 86 to maintain removed cotton in the desired path. Rear edge 104 of the generally horizontally disposed portion of the roll support 90 inside the bend location 100 is welded to the top of the tubular beam 94. The cylinder bracket 58 is welded to the front face of the beam 94 and to the bottom of the horizontally disposed portion of the roll support 90 adjacent the bend location 100.

A front plate or forward wall structure 110 is welded to the forward end of each of the harvesting mechanism supports 64 and 66. The wall structure 110 includes an upright front wall 112 and a lower downwardly and rearwardly projecting portion 114 having a rear face welded to the front edge of the auger trough 86. The rear face of the portion 114 is also welded to the front edge of the brush roll support 90. Upper edge 118 of the wall structure 110 is generally horizontal and extends inwardly from near the upper edge of the front of the adjacent sidewall 80. Plant gatherer attaching brackets 120 and a height-sensing pivot bracket 122 are welded to the front wall 112. Panel locating and support pegs 124 are welded or bolted to the front wall structure and extend rearwardly therefrom.

A plant gatherer 126 (FIG. 6) is pivotally connected near its lower rear portion by pins 129 to the attaching brackets 120 so that the nose of the gatherer is free to rock up and down to follow the ground contour. A shoe 129 (FIG. 1) on the bottom of the gatherer 126 is connected to a shoe rod 130. The upper end of the rod 130 is connected to the front of a height-sensing pivot 132 rockably mounted on the pivot bracket 122. The rear of the pivot 132 is connected to a height-sensing rod 134 which extends rearwardly through the harvesting compartment adjacent the sidewall 80 to a control valve (not shown). The control valve is connected between a source of pressurized hydraulic fluid on the harvester and the hydraulic cylinder 54 to automatically control the height of row unit 18 in response to the movement of the shoe 129. Automatic height-sensing controls for cotton harvester row units are well known and commercially available, and therefore will not be described in detail here.

Each of the harvesting mechanism supports or side structures 64 and 66 carries a conventional brush roll unit 140 and unit auger 142. Each brush roll unit 140 is journalled in a conventional manner for rotation about an axis generally parallel to the brush roll support 90 by a rear bearing 143 mounted on the rear wall 72 and by a transversely adjustable forward bearing (not shown) carried by the corresponding support. Each brush roll unit 140 includes a flexible stripper roll 144 having fore-and-aft extending retainers 145 supporting alternate rubber flaps 147 and nylon brushes 149. The distance between the rolls 144 is adjusted for cotton plant stalk size and field conditions by moving the forward bearings, for example, by turning eyebolts connected at one end to the forward bearings and at the other end to the unit frame. One of the brush roll units 140 is connected by a universal joint 150 (FIG. 2) to a unit drive shaft 152 connected to a conventional drive arrangement on the cross auger frame 16. A drive gear 154 rotates with the first brush roll 140 and meshes with an identical gear (not shown) operably connected to the second brush roll 140 to drive the rolls in counter-rotating fashion. The brushes 149 and flaps 147 may be reversed in each brush roll unit 140 for extended life.

Each row unit auger 142 is journalled for rotation about the axis of the corresponding trough 86 by a forward bearing (not shown) carried by the forward wall structure 110, and by a rear bearing 162 carried by the rear wall 72. A drive gear 164 is mounted for rotation with the auger 142 about its axis, and is drivingly connected to the roll unit drive gear 154 by an idler gear 166. A top sheet 260 (FIG. 6) is bolted to flanges 262 to cover the portion of the structure 62 above the drive gears.

Figure 9:
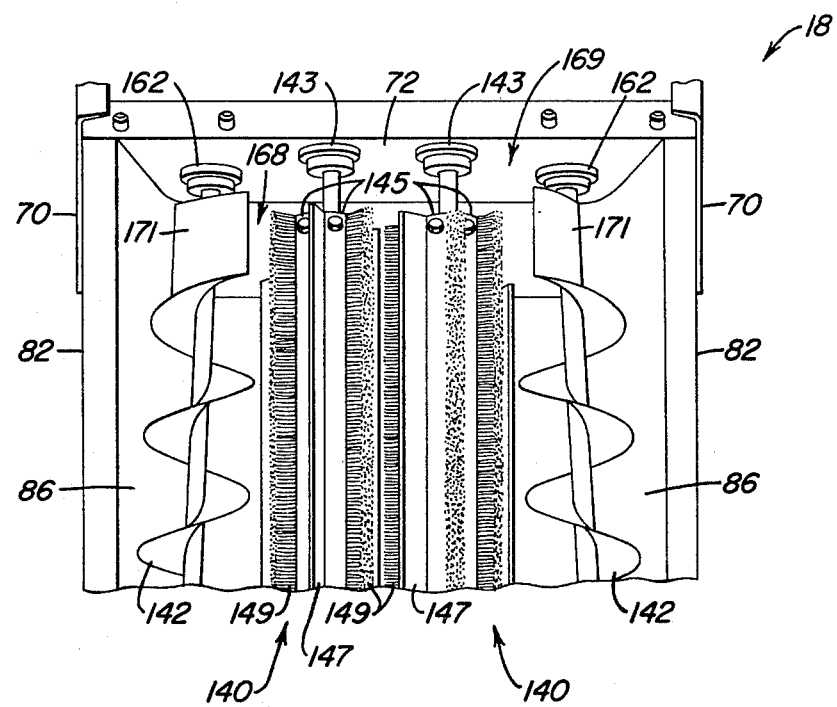
FIG. 9 is a top view of the rear portion of the row unit showing the discharge area which opens downwardly into the cross auger.

As best seen in FIGS. 2 and 9, a lower opening indicated generally at 168 is defined in a discharge area 169 which extends transversely between the sidewalls 70 and which is bounded at the rear by the wall 72 and at the front by the rear end of auger troughs 86 and the structural member 92. The brushes 149 and flaps 147 of the brush rolls 144 extend into the discharge area 169 above the opening 168. The unit augers 142 terminate in rear paddle structure 171, also located in the discharge area 159 above the opening 168. The paddle structure 171 actively directs the cotton exiting the troughs 86 downwardly through the opening 168. The retainers 145 releasably secure the brushes 149 and flaps 147 in position and permit them to be reversed for extended life.

The counter-rotating brush rolls 144 sweep the cotton from the cotton plants which are directed into the plant passage 68 as the harvester moves forwardly through the field. The cotton removed from the plants is directed into the unit auger troughs 86 where it is carried rearwardly by the augers 142 and is directed by the paddle structure 171 into the cross auger frame 16 through the opening 158. A transverse auger or conveyor 170 moves the cotton inwardly to a central location from which the air duct system 25 conveys the cotton to the receptacle 22.

The above-described construction of the shell assembly 60 defines a lower harvesting compartment, indicated generally at 180, between the sidewalls 80 and forwardly of the rear wall 72. The compartment 180 opens upwardly and forwardly and is virtually unencumbered with any support structure or the like which would impede access to the harvesting mechanisms including the brush roll units 140 and the unit augers 142.

Figure 7:
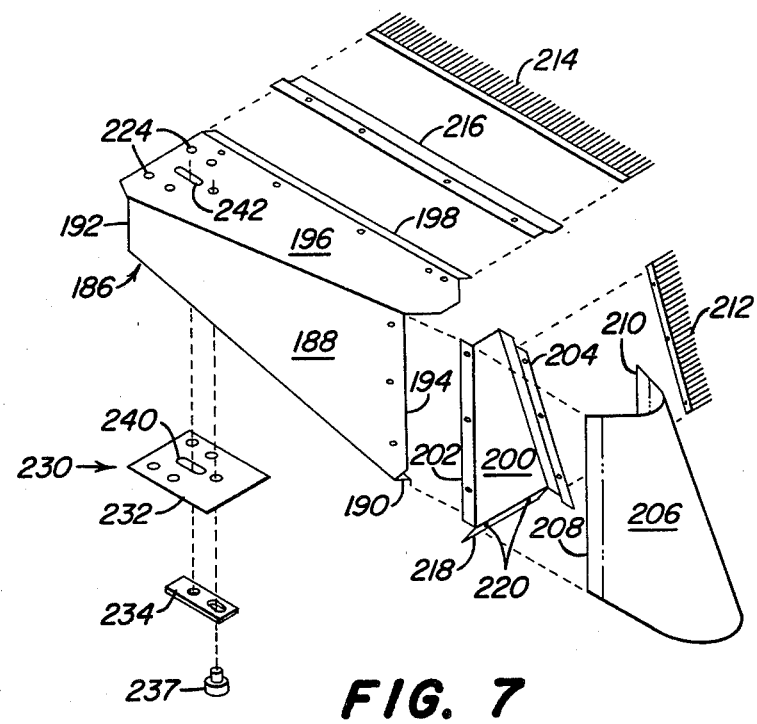
FIG. 7 is a perspective view of the right-hand panel of the structure shown in FIG. 6 with the parts disassembled to show panel construction details.
Figure 5:
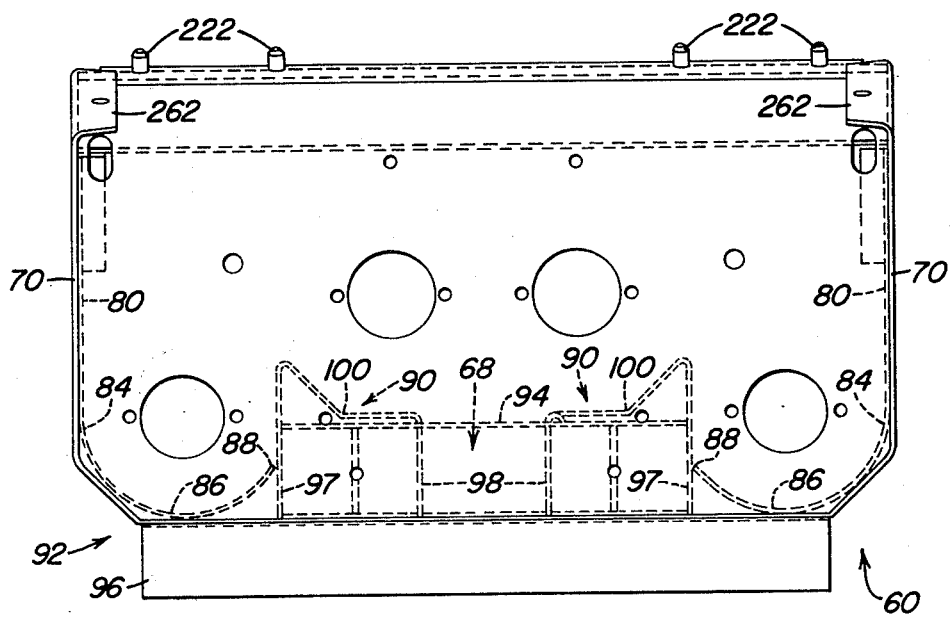
FIG. 5 is a rear view of the shell assembly shown in FIGS. 3 and 4.

Removable overhead panel structure 182 (FIG. 6) is provided to selectively close the area above the lower harvesting compartment 180 and prevent the cotton removed and agitated by the brush rolls 144 from being thrown upwardly or forwardly out of the unit 18. The panel structure 182 includes individual left- and right-hand panels 184 and 186 formed from sheet metal and having outer sidewalls 188 which, when the structure is attached, form upward extensions of the sidewalls 80 for the supports 64 and 66, respectively. Each outer sidewall 188 terminates at the lower edge in a fore-and-aft extending flange 190 (FIG. 7) which angles downwardly from a rear upright edge 192 to a forward upright edge 194. A substantially horizontal and planar top surface 196 extends inwardly from the outer sidewall 188 and terminates in a flange or edge portion 198 which is angled downwardly several degrees with respect to the surface 196. An upright front panel 200 includes a rearwardly directed side flange 202 which is bolted to the forward edge 194 of the outer sidewall 188. The front panel 200 extends upwardly from the flange 190 to the top surface 196 and terminates at an inner flange 204. An upper plant gatherer 206 is bolted at rear outside edge 208 to the flange 202 and forward edge 194. The bottom of the upper plant gatherer 206 fits within the upper opening of the lower gatherer 126 (FIG. 6) to permit the latter to pivot about the pins 128. The opposite rear edge 210 of the gatherer 206 is bolted to the inner flange 204 along with an upright column of horizontally disposed bristles 212 with ends which extend inwardly and slightly rearwardly. A fore-and-aft extending row of bristles 214 with ends that extend inwardly and slightly downwardly is clamped to the flange 198 by a retaining bracket 216 bolted to the top surface 196.

The front panel 200 includes a downwardly and rearwardly extending flange 218 having apertures 220 positioned for receiving the panel locating and supporting pegs 124 when the panel structure 182 is attached to the shell assembly 60. The pegs 124 support the front of each of the panels 184 and 186 with the panel sidewall flange 190 abutted against the downwardly and forwardly sloping flange 82 of the shell assembly sidewall 80.

Locating pegs 222 are connected to the top of the member 74. Apertures 224 in the rear of the top surface 196 are positioned to receive the pegs 222 as the panel structure is placed over the shell assembly 60.

Figure 8:
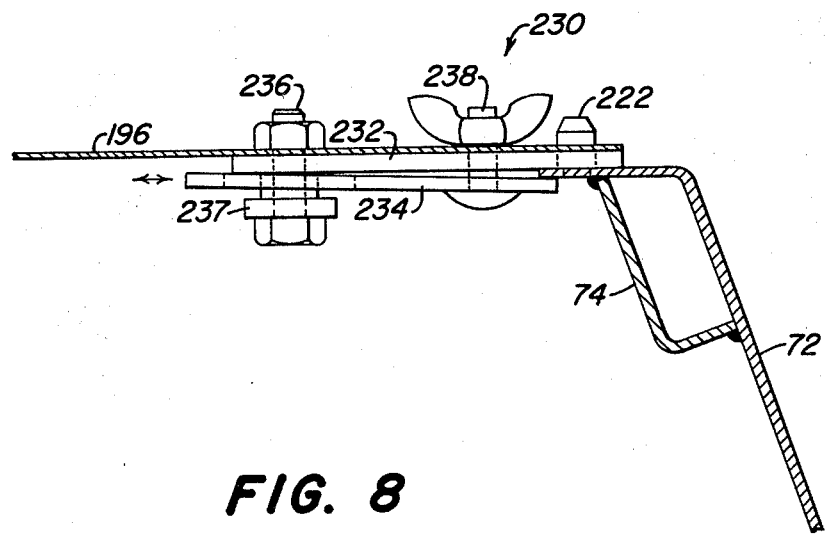
FIG. 8 is an enlarged view of the releasable latch which retains each overhead panel in position.
Figure 3:
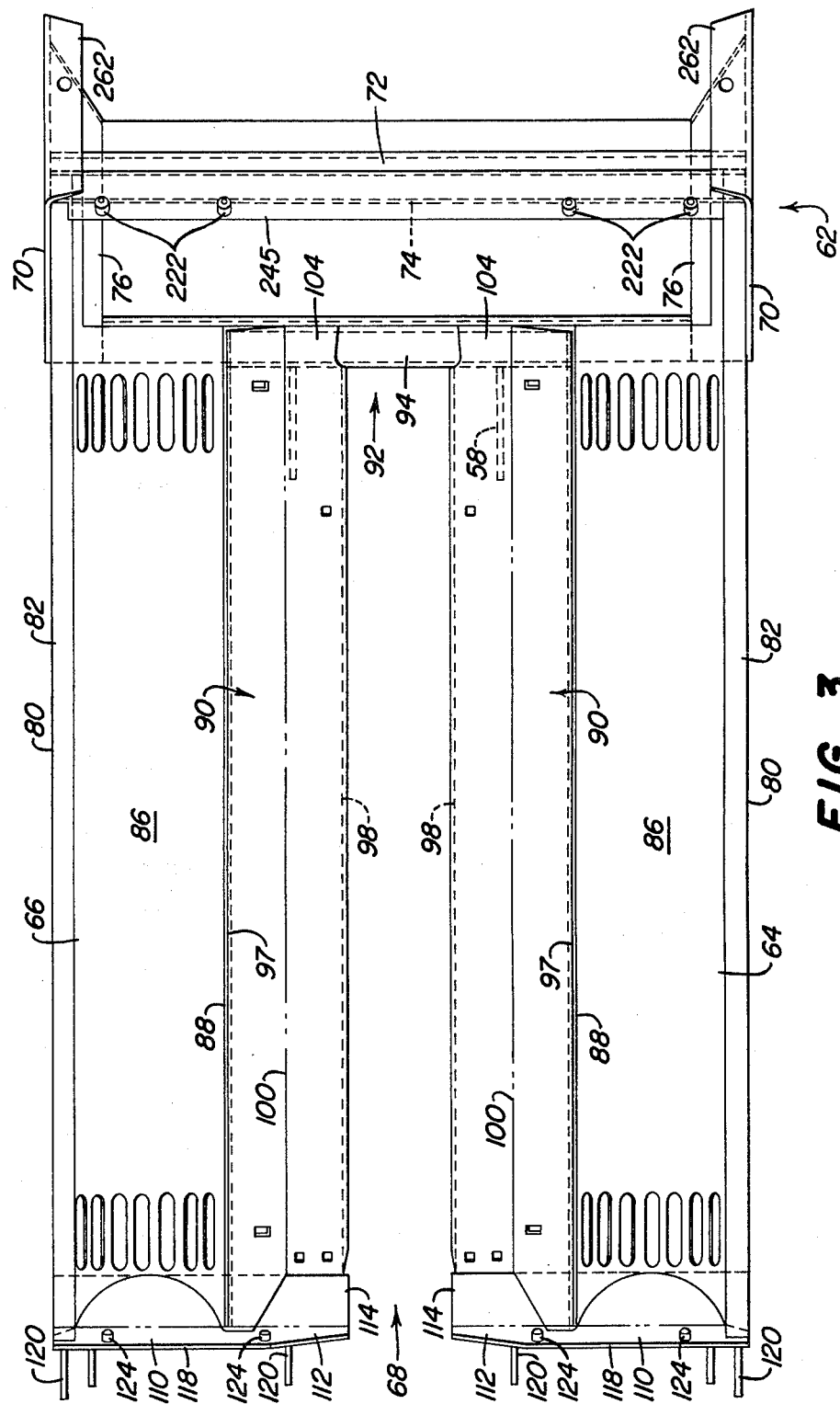
FIG. 3 is a top view of the shell assembly for the row unit.

A releasable latch assembly 230 (FIGS. 2, 7 and 8) is connected to the top surface 196 for locking each of the panels 184 and 186 over the shell assembly 60 after it is properly positioned by the locating pegs 124 and 222. The latch assembly 230 includes an apertured reinforcing plate 232 and a slotted latch member 234 carried under the rear of the top surface 196 by a securing bolt 236 and spacer 237. A carriage bolt 238 extends upwardly through slots 240 and 242 in the plate 232 and the top surface 196, respectively. A wing nut 244 threaded over the end of the bolt 238 is tightened to draw the latch member 234 upwardly against the bottom of a flange 245 which extends forwardly above the angle member 74 (FIGS. 2 and 8). Loosening the wing nut 244 permits the latch member 234 to be slid forwardly beyond the flange 245 so that the panel can be lifted from the locating pins 222. Once the rear of the panel is lifted, the entire panel can be moved rearwardly until the apertured front flange 218 (FIG. 7) is clear of the locating pegs 124. Thereafter, the panel can be lifted off the lower shell assembly to provide convenient access to the unit augers 142 and brush rolls 144.

When the overhead panel structure 182 (FIG. 6) is in position over the lower shell assembly 60, the inner edges of the panels 184 and 186 define an upper fore-and-aft extending opening indicated generally at 250 which is directly above the plant passage 68. The inside edges of the plant gatherers 126 and 206 define an upright forward opening 252 at the mouth of the plant passage 68. The upright columns of generally horizontal bristles 212 have closely adjacent free ends to close the forward opening 252. Since each set of bristles 212 is angled slightly rearwardly, the cotton plants can pass into the harvesting compartment through the bristles relatively easily while removed cotton agitated by the brush rolls will bounce off the bristles or attach themselves to the ends of the bristles. Any cotton attached to the ends of the bristles 212 will be removed by the combing action of the plants passing between the sets of bristles and through the opening 252.

The upper rows of generally horizontal bristles 214 have closely adjacent ends directed slightly downwardly to effectively close the upper opening 250 to removed and agitated cotton within the harvesting compartment while permitting cotton plants to be pulled downwardly between the two rows of bristles into the compartment. The upper opening 250 and the rows of bristles 214 permit the top 196 of the overhead panel structure 182 to slope downwardly so that the front of the row unit 18 is substantially lower than the rear when the unit is in the field-working position (FIG. 1). As the row unit 18 moves forwardly, any cotton plants which extend above the upright opening 252 will be pulled through the upper opening 250, which increases in distance above the ground in the rearward direction, and through the rows of bristles 214 without loss of or injury to the cotton. The front bristles of the rows of bristles 214 contact the top bristles of the column of bristles 212 to provide a continuous barrier between the panels 184 and 186. When the overhead panel structure 182 is attached, a substantially closed harvesting compartment is defined which extends in the fore-and-aft direction between the rear wall 72 and the front panel 200 of the plant gatherers 206, and laterally generally between the plane of the sidewalls 80. The top of the panel structure angles downwardly in the forward direction for better visibility.

The lower shell assembly structure 60 maintains the preselected spacing between the brush roll units 140 without an upper arch or other structural connection between the forward portions of the row unit side structures 64 and 66. The panels 184 and 186, which are preferably formed from sheet metal, are relatively light in weight and can be removed or attached independently of each other so that they are less cumbersome for the operator to handle.

When attached, the panels 184 and 186 provide some torsional strength to the side structures 64 and 66, respectively. A limited amount of vertical flexibility of the side structures 64 and 66 results from the elimination of a forward structural connection. Such flexibility lessens shock loading of the unit when obstacles or rough ground surfaces are encountered during harvesting. The flexibility is, however, limited by the structure of the lower shell assembly 60 to prevent a change in brush roll alignment that would appreciably decrease the harvesting efficiency of the rolls 144.

Having described the preferred embodiment, it will be apparent that modifications can be made without departing from the scope of the invention as defined in the accompanying claims.

I claim:

1. In a harvester having a frame adapted for forward movement over a field planted with parallel rows of plants, a row unit adapted for attachment to the frame, comprising: a unit frame including a rear mounting structure, a pair of generally fore-and-aft extending support structures with generally upright sidewalls, means connecting the aft ends of the support structures to the rear mounting structure for supporting said support structures in side-by-side cantilever fashion with the non-connected free fore ends of the support structures spaced apart to define a fore-and-aft extending plant passage for receiving a row of plants therebetween and a generally open top portion which opens upwardly between the sidewalls; harvesting means carried by the support structures adjacent the passage and between the sidewalls for removing the crop from the plants; overhead panel structure; means for releasably securing the overhead panel structure to the unit frame above the support structure to generally close the top portion and define a substantially closed harvesting compartment behind the fore ends and above the plant passage; and wherein the support structures comprise stiffener means for affording both transverse and vertical stability to the support structures to maintain a preselected plant passage width when the overhead panel is in the released condition, said stiffener means including a fore-and-aft extending reinforcing member, and wherein said rear mounting structure includes transverse beam structure connected to the aft end of the reinforcing member.

2. The invention as set forth in claim 1 wherein the overhead panel structure comprises a pair of individual sheet metal panels, each releasably securable above a corresponding support structure.

3. The invention as set forth in claim 2 wherein the overhead panel structure includes horizontal top sheets terminating in transversely offset inner edge portions to define a gap between the panel structures above the plant passage when said panel structures are secured to the unit frame, and wherein the row unit further comprises fore-and-aft extending rows of bristle means connected to the edge portions and extending over the plant passage for permitting plants to move downwardly between the gap into the harvesting compartment while preventing the harvested crop from passing out of the harvesting compartment through the gap.

4. In a framed cotton harvester adapted for forward movement over the ground, a row unit comprising: rear support structure; frame structure angling downwardly and forwardly from the rear support structure, said frame structure comprising a pair of transversely spaced fore-and-aft structural members connected at their aft ends to the rear support structure and extending therefrom in substantial cantilever fashion to free ends defining a crop receiving passage therebetween, said frame structure defining a lower crop harvesting compartment including sidewalls transversely spaced on opposite sides of the crop receiving passage and also defining a substantially open top portion extending between the sidewalls; crop harvesting means supported by the frame structure adjacent the crop receiving passage within the lower harvesting compartment generally below the open top portion for removing cotton from plants; and top enclosing means, separate from the frame structure and selectively attachable to and removable from the frame structure for substantially closing the top portion to provide an enclosed crop harvesting compartment when attached and for providing downward access to the harvesting means when removed, said top enclosing means including top structure having a substantial downward slope in the forward direction when the enclosing means is attached to the frame structure so that the front of the row unit is substantially lower than the rear of the unit; and wherein said rear support structure and frame structure each include a reinforcing member providing both transverse and vertical stability to said structural members to maintain a preselected plant passage width independently of the top enclosing means.

5. A cotton stripper row unit adapted for attachment to a mobile harvester frame for forward movement through a field with rows of cotton plants, said row unit comprising: rear support structure adapted for connection to the harvester frame; a pair of fore-and-aft extending side support structures connected at their aft ends to the rear support structure and extending forwardly therefrom in substantial cantilever fashion, said rear support structure transversely spacing the side support structures to define a plant passage for receiving a row of cotton plants therebetween; a pair of fore-and-aft extending stripper roll means rotatably supported by the side support structures on either side of the plant passage for removing cotton from the plants; conveying means supported by the support structure adjacent the stripper roll means for moving the removed cotton rearwardly of said structure, wherein the side support structures include outer sidewalls spaced outwardly of the conveying means and defining a lower compartment structure, said lower compartment structure opening upwardly and being substantially unencumbered in an area above the conveying means and the stripper roll means; and panel structure selectively attachable to and removable from the side support structure and including upright panel sidewalls extending upwardly from the respective support structure sidewalls when attached, said panel structure also including generally horizontal top structure extending inwardly from the panel sidewalls and cooperating with the lower compartment structure to define a harvesting compartment substantially closing the area above the stripper roll means and conveying means to confine removed cotton therein until removed by the conveying means.

6. The invention as set forth in claim 5 wherein the side support structure includes a fore-and-aft extending channel-shaped stripper roll means support having a first upright sidewall adjacent the plant passage and a second upright sidewall spaced outwardly from the first and means for connecting the sidewalls located below the stripper roll means, said sidewalls extending substantially the entire length of the support structure, a trough-shaped member connected to and extending generally parallel to the outer sidewall and having a laterally outward side connected to the outer sidewall of the side support structure; wherein the rear support structure includes transverse beam structure; and means connecting the aft end of the stripper roll means support to the transverse beam structure for providing both transverse and vertical stability to the side support structure with or without the panel structure attached thereto.

7. The invention as set forth in claim 5 or 6 wherein the rear support structure includes transversely spaced sidewalls connected to the outer sidewalls of the side support structures, an upright, transverse wall connected between the rear support structure sidewalls, and means for supporting the panel structure above the lower compartment structure.

8. The invention as set forth in claim 7 wherein the panel structure includes a rear connecting portion, said row unit further comprising releasable latch means for selectively locking the rear connecting portion to the first means.

9. The invention as set forth in claim 5 or 6 wherein the panel structure and the side support structures include locating means for guiding said panel structure to, and holding the structure in a preselected attached position.

10. The invention as set forth in claim 9 wherein said guiding means comprises a plurality of protrusions and complementary apertures.

11. The invention as set forth in claim 6 wherein the transverse beam structure includes a transverse tubular beam connected to the stripper roll means support and a transverse angle member supported below the tubular beam and the trough-shaped member.

12. The invention as set forth in claim 5 or 6 wherein the panel structure includes a pair of opposite side panels fabricated from sheet metal, each side panel including an upright fore-and-aft extending sidewall having a length generally equal to the length of the corresponding side support structure, a generally horizontal top portion extending inwardly from the side panel sidewall to an inner edge extending above the plant passage, when the panel structure is attached, wherein the edges define an upper opening above the plant passage, and means extending across the upper opening for permitting cotton plants to be directed through said opening into the harvesting compartment and for preventing removed cotton in the harvesting compartment from being directed upwardly through said opening.

13. The invention as set forth in claim 12 wherein the panel structure further comprises plant gathering means connected to the fore end of the side panels for directing cotton plants into the plant passage and defining an upright forward mouth portion opening rearwardly into the harvesting compartment, wherein the top portion of each side panel slopes downwardly in the forward direction and the top of the forward mouth portion is located a distance above the ground less than the distance the rear of the upper opening is located above the ground.

14. The invention as set forth in claim 13 wherein the row unit includes means extending across the mouth portion for permitting cotton plants to move rearwardly through the mouth portion into the harvesting compartment and for preventing removed cotton in the harvesting compartment from being directed forwardly out said mouth portion.

15. The invention as set forth in claim 12 wherein the means extending across the upper opening comprises a row of generally horizontal bristles.

16. The invention as set forth in claim 14 or 15 wherein the means extending across the mouth portion comprises a generally upright column of generally horizontal bristles.

17. A cotton stripper row unit adapted for attachment to a mobile harvester frame for forward movement through a field with rows of cotton plants, said row unit comprising: rear support structure adapted for connection to the harvester frame; transversely spaced fore-and-aft extending side support structures connected at their aft ends to the rears support structure and extending forwardly therefrom, said side support structures including a pair of inner fore-and-aft extending harvesting roll supports defining a plant passage therebetween and a pair of trough-shaped members connected to and extending along and outwardly of the respective roll supports; an auger journalled for rotation above each trough-shaped member; harvesting roll means journalled above each roll support for removing cotton from the cotton plants and directing the removed cotton toward the augers; and a panel structure selectively attachable to and removable from the side support structures and defining therewith when attached a generally closed fore-and-aft extending harvesting compartment located above the side support structures, said panel structure including a pair of forward wall structures adjacent and extending upwardly from the fore ends of the corresponding harvesting roll means, said wall structures spaced to define an upright cotton plant receiving opening at the fore end of the plant passage.

18. The invention as set forth in claim 17 wherein the panel structure includes a pair of individual side panels, each selectively attachable above one of the side support structures and including an upright outer sidewall extending upwardly from the corresponding trough-shaped member and rearwardly from the corresponding forward wall structure, each side panel also including a top portion extending inwardly from the outer sidewall above the augers and harvesting roll means.

19. The invention as set forth in claim 17 or 18 wherein the rear support structure includes a generally transverse upright rear wall structure cooperating with the attached panel structure to close the rear of the harvesting compartment.

20. The invention as set forth in claim 19 wherein the rear wall structure includes means for rotatably supporting the aft ends of the harvesting roll means.

21. The invention as set forth in claim 19 further comprising releasable latch means connected between the rear wall structure and the panel structure for maintaining the latter in position above the side support structures.

22. The invention as set forth in claim 8 wherein the side panels when attached to the support structure define a fore-and-aft extending upper opening between the top portions which extends rearwardly from the cotton plant receiving opening.

23. The invention as set forth in claim 22 further comprising horizontal bristle means between the top portions for closing the upper opening to cotton within the harvesting compartment.

24. The invention as set forth in claim 22 or 23 further comprising horizontal bristle means between the forward wall structures for closing the plant receiving opening to cotton within the harvesting compartment.

25. The invention as set forth in claim 18 or 22 wherein the top portions slope downwardly in the forward direction.

26. The invention as set forth in claim 17 wherein the rear support structure includes a downwardly opening discharge area behind the trough-shaped members, and rear wall structure located rearwardly of said discharge area and generally defining the rear of the harvesting compartment, wherein the auger and harvesting roll means are journalled in said rear wall structure and extend rearwardly into the discharge area.

27. The invention as set forth in claim 26 wherein the auger includes means for forcibly directing removed cotton downwardly through the opening in the discharge area.

28. A cotton harvester row unit adapted for attachment to a mobile harvester frame for forward movement through a field with rows of cotton plants, said row unit comprising: fore-and-aft extending lower shell structure supported adjacent its aft end by the harvester frame and including forwardly and downwardly extending, transversely spaced harvesting mechanism supports defining a fore-and-aft extending plant passage therebetween, said lower shell structure also defining a lower harvesting compartment area, harvesting mechanisms supported by the supports adjacent the passage for removing cotton from the plants, upright plant gatherers located on opposite sides of the passage near the front of the passage and defining an upright forward mouth for directing plants into the passage, upper compartment structure supported above the lower harvesting compartment and including a top portion extending rearwardly from the top of the plant gatherers, said top portion including a plant-receiving opening extending rearwardly from the mouth above the plant passage, fore-and-aft extending rows of bristle means extending substantially the length of the opening above the plant passage for permitting cotton plants to move downwardly through the plant-receiving opening and closing said opening to the removed cotton within the compartment structure, and means for conveying the removed cotton from the lower harvesting compartment.

29. The invention as set forth in claim 28 further comprising upright columns of bristle means extending downwardly from the rows of bristle means substantially the height of the mouth for closing said mouth to removed cotton within the compartment structure.

30. The invention as set forth in claim 28 or 29 wherein the top portion has a substantial downward slope in the forward direction.

31. In a framed cotton harvester adapted for forward movement over a field of cotton plants, a row unit comprising: a lower shell assembly supported by and extending forwardly from the harvester frame, said assembly including rear transversely extending support structure, and fore-and-aft extending side structures connected at their aft ends to the rear support structure and extending forwardly therefrom to free forward ends spaced to define a plant passage therebetween; cotton harvesting mechanisms supported by the shell assembly adjacent the plant passage for removing cotton from the plants; panel structure supported by the lower shell assembly above the side structures, said panel structure comprising: a pair of fore-and-aft sidewalls extending upwardly from the side structures and spaced outwardly from the harvesting mechanisms, top portions extending laterally inwardly from the respective sidewalls and terminating in fore-and-aft extending inner edge portions offset laterally from each other to define an opening between said top portions directly above the plant passage, and upright forward wall portions extending downwardly from the fore end of the respective top portions and laterally to a juncture with the coresponding sidewall, said wall portions terminating in opposed, transversely spaced upright inner edges at the fore end of the plant passage, said upright edges defining an upright mouth extending downwardly from the opening for directing cotton plants into the passage, wherein said top portions have a substantial slope downwardly in the forward direction; and first means extending across the opening in the top portion and the mouth for permitting cotton plants to move rearwardly into the plant passage while preventing removed cotton from passing outwardly through said opening and mouth.

32. The invention as set forth in claim 31 wherein said first means comprise bristles connected to and extending horizontally inwardly from the edges and edge portions.

33. In a cotton harvester having a transverse row unit support frame and a cotton conveyer supported by the frame, a row unit comprising: a row unit frame including rear mounting structure attachable to the support frame adjacent the conveyor, said rear mounting structure including a single transverse and generally planar rear wall, a pair of fore-and-aft extending brush roll supports connected at their aft ends to the rear mounting structure and transversely spaced to define a fore-and-aft extending plant passage, and a fore-and-aft extending auger trough supported adjacent each roll support; harvesting means including transversely spaced fore-and-aft extending brush rolls supported by the brush roll supports and including means for journalling the aft ends of the brush rolls in the planar wall, and a fore-and-aft extending auger journalled at its aft end in said planar wall for rotation above each auger trough; and wherein said rear wall is spaced rearwardly of the auger troughs and said support frame defines a discharge area located forward of said rear wall and rearward of said troughs, said discharge area opening into the conveyor below the aft ends of the brush rolls.

34. The invention as set forth in claim 33 wherein the means for journalling the aft ends of the brush rolls and augers include bearings supported by the rear wall.

35. The invention as set forth in claim 33 or 34 further comprising overhead panel structure supported above the harvesting means and defining a fore-and-aft extending harvesting compartment extending rearwardly from the forward end of the plant passage to the rear wall.

36. The invention as set forth in claim 35 wherein the overhead panel structure is selectively attachable to and removable from the row unit frame.

37. The invention as set forth in claim 33 or 34 wherein the discharge area opens downwardly into the conveyor.

38. The invention as set forth in claim 37 wherein the augers include paddle structure located in the discharge area above the opening for directing cotton into the conveyor.

39. The invention as set forth in claim 33 or 34 wherein the brush rolls include fore-and-aft extending brushes and flaps having rear portions located in the discharge area and front portions located forwardly of the discharge area.

40. The invention as set forth in claim 39 wherein the brush rolls include bracket means for permitting the brushes and flaps to be reversed end for end.

41. A cotton stripper row unit adapted for attachment to a mobile harvester frame for forward movement through a field with rows of cotton plants, said row unit comprising: rear support structure adapted for connection to the harvester frame; a pair of fore-and-aft extending side support structures connected at their aft ends to the rear support structure and extending forwardly therefrom in substantial cantilever fashion, said rear support structure transversely spacing the side support structures to define a plant passage for receiving a row of cotton plants therebetween; a pair of fore-and-aft extending stripper roll means rotatably supported by the side support structures on either side of the plant passage for removing cotton from the plants; conveying means supported by the support structure adjacent the stripper roll means for moving the removed cotton rearwardly of said structure, wherein the side support structures include outer sidewalls spaced outwardly of the conveying means and defining a lower compartment structure, said lower compartment structure opening upwardly and being substantially unencumbered in an area above the conveying means and the stripper roll means; and panel structure selectively attachable to and removable from the side support structure and extending upwardly and inwardly from the sidewalls when attached, said panel structure cooperating with the lower compartment structure to define a harvesting compartment substantially closing the area above the stripper roll means and conveying means to confine removed cotton therein until removed by the conveying means, wherein the side support structure includes a fore-and-aft extending channel-shaped stripper roll means support having a first upright sidewall adjacent the plant passage and a second upright sidewall spaced outwardly from the first and means for connecting the sidewalls located below the stripper roll means, said sidewalls extending substantially the entire length of the support structure, a trough-shaped member connected to and extending generally parallel to the outer sidewall and having a laterally outward side connected to the outer sidewall of the side support structure; wherein the rear support structure includes transverse beam structure; and means connecting the aft end of the stripper roll means support to the transverse beam structure for providing both transverse and vertical stability to the side support structure with or without the panel structure attached thereto.

42. The invention as set forth in claim 41 wherein the rear support structure includes transversely spaced sidewalls connected to the outer sidewalls of the side support structures, an upright, transverse wall connected between the rear support structure sidewalls, and first means extending forwardly from said transverse wall for supporting the panel structure above the lower compartment structure.

43. The invention as set forth in claim 42 wherein the panel structure includes a rear connecting portion, said row unit further comprising releasable latch means for selectively locking the rear connecting portion to the first means.

44. The invention as set forth in claim 41 wherein the panel structure and the side support structures include locating means for guiding said panel structure to, and holding the structure in a preselected attached position.

45. The invention as set forth in claim 44 wherein said guiding means comprises a plurality of protrusions and complementary apertures.

46. The invention as set forth in claim 41 wherein the transverse beam structure includes a transverse tubular beam connected to the stripper roll means support and a transverse angle member supported below the tubular beam and the trough-shaped member.

47. The invention as set forth in claim 4 wherein the panel structure includes a pair of opposite side panels fabricated from sheet metal, each side panel including an upright fore-and-aft extending sidewall having a length generally equal to the length of the corresponding side support structure, a generally horizontal top portion extending inwardly from the side panel sidewall to an inner edge extending above the plant passage, when the panel structure is attached, wherein the edges define an upper opening above the plant passage, and means extending across the upper opening for permitting cotton plants to be directed through said opening into the harvesting compartment and for preventing removed cotton in the harvesting compartment from being directed upwardly through said opening.

48. The invention as set forth in claim 47 wherein the panel structure further comprises plant gathering means connected to the fore end of the side panels for directing cotton plants into the plant passage and defining an upright forward mouth portion opening rearwardly into the harvesting compartment, wherein the top portion of each side panel slopes downwardly in the forward direction and the top of the forward mouth portion is located a distance above the ground less than the distance the rear of the upper opening is located above the ground.

49. The invention as set forth in claim 48 wherein the row unit includes means extending across the mouth portion for permitting cotton plants to move rearwardly through the mouth portion into the harvesting compartment and for preventing removed cotton in the harvesting compartment from being directed forwardly out said mouth portion.

50. The invention as set forth in claim 48 wherein the means extending across the upper opening comprises a row of generally horizontal bristles.

51. The invention as set forth in claim 49 or 50 wherein the means extending across the mouth portion comprises a generally upright column of generally horizontal bristles.

52. A cotton stripper row unit adapted for attachment to a mobile harvester frame for forward movement through a field with rows of cotton plants, said row unit comprising: rear support structure adapted for connection to the harvester frame; a pair of fore-and-aft extending side support structures connected at their aft ends to the rear support structure and extending forwardly therefrom in substantial cantilever fashion, said rear support structure transversely spacing the side support structures to define a plant passage for receiving a row of cotton plants therebetween; a pair of fore-and-aft extending stripper roll means rotatably supported by the side support structures on either side of the plant passage for removing cotton from the plants; conveying means supported by the support structure adjacent the stripper roll means for moving the removed cotton rearwardly of said structure, wherein the side support structures include outer sidewalls spaced outwardly of the conveying means and defining a lower compartment structure, said lower compartment structure opening upwardly and being substantially unencumbered in an area above the conveying means and the stripper roll means; and panel structure selectively attachable to and removable from the side support structure and extending upwardly and inwardly from the sidewalls when attached, said panel structure cooperating with the lower compartment structure to define a harvesting compartment substantially closing the area above the stripper roll means and conveying means to confine removed cotton therein until removed by the conveying means, wherein the rear support structure includes transversely spaced sidewalls connected to the outer sidewalls of the side support structures, an upright, transverse wall connected between the rear support structure sidewalls, and first means extending forwardly from said transverse wall for supporting the panel structure above the lower compartment structure.

53. The invention as set forth in claim 52 wherein the panel structure includes a rear connecting portion, said row unit further comprising releasable latch means for selectively locking the rear connecting portion to the first means.

54. A cotton stripper row unit adapted for attachment to a mobile harvester frame for forward movement through a field with rows of cotton plants, said row unit comprising: rear support structure adapted for connection to the harvester frame; a pair of fore-and-aft extending side support structures connected at their aft ends to the rear support structure and extending forwardly therefrom in substantial cantilever fashion, said rear support structure transversely spacing the side support structures to define a plant passage for receiving a row of cotton plants therebetween; a pair of fore-and-aft extending stripper roll means rotatably supported by the side support structures on either side of the plant passage for removing cotton from the plants; conveying means supported by the support structure adjacent the stripper roll means for moving the removed cotton rearwardly of said structure, wherein the side support structures include outer sidewalls spaced outwardly of the conveying means and defining a lower compartment structure, said lower compartment structure opening upwardly and being substantially unencumbered in an area above the conveying means and the stripper roll means; and panel structure selectively attachable to and removable from the side support structure and extending upwardly and inwardly from the sidewalls when attached, said panel structure cooperating with the lower compartment structure to define a harvesting compartment substantially closing the area above the stripper roll means and conveying means to confine removed cotton therein until removed by the conveying means wherein the panel structure includes a pair of opposite side panels fabricated from sheet metal, each side panel including an upright fore-and-aft extending sidewall having a length generally equal to the length of the corresponding side support structure, a generally horizontal top portion extending inwardly from the side panel sidewall to an inner edge extending above the plant passage, when the panel structure is attached, wherein the edges define an upper opening above the plant passage, and means extending across the upper opening for permitting cotton plants to be directed through said opening into the harvesting compartment and for preventing removed cotton in the harvesting compartment from being directed upwardly through said opening.

55. The invention as set forth in claim 54 wherein the rear support structure includes transversely spaced sidewalls connected to the outer sidewalls of the side support structures, an upright, transverse wall connected between the rear support structure sidewalls, and means for supporting the panel structure above the lower compartment structure.

56. The invention as set forth in claim 55 wherein the panel structure includes a rear connecting portion, said row unit further comprising releasable latch means for selectively locking the rear connecting portion to the first means.

57. The invention as set forth in claim 54 wherein the panel structure and the side support structures include locating means for guiding said panel structure to, and holding the structure in a preselected attached position.

58. The invention as set forth in claim 57 wherein said guiding means comprises a plurality of protrusions and complementary apertures.

59. The invention as set forth in claim 54 wherein the top portion extends downwardly in the forward direction so that the upper opening slopes downwardly, and wherein the means extending across the upper opening comprises bristles.

* * * * *

UNITED STATES PATENT AND TRADEMARK OFFICE
CERTIFICATE OF CORRECTION

PATENT NO. : 4,338,770

DATED : 13 July 1982

INVENTOR(S) : Francis E. Schlueter

It is certified that error appears in the above-identified patent and that said Letters Patent is hereby corrected as shown below:

Column 12, line 26, delete "rears" and insert -- rear --.

Column 14, line 19, delete "coresponding" and insert -- corresponding --.

Column 16, line 20, delete "4" and insert -- 41 --; line 53, delete "48" and insert -- 47 --.

Signed and Sealed this

Twenty-second Day of February 1983

[SEAL]

Attest:

GERALD J. MOSSINGHOFF

Attesting Officer     Commissioner of Patents and Trademarks